United States Patent [19]
Chao

[11] Patent Number: 6,109,747
[45] Date of Patent: *Aug. 29, 2000

[54] EYEGLASS FRAMES WITH MAGNETS IN FLANGES

[75] Inventor: David Yinkai Chao, Towson, Md.

[73] Assignee: Contour Optik, Inc., Chiayi, Taiwan

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/847,711

[22] Filed: Apr. 28, 1997

[51] Int. Cl.$^7$ .................................................. G02C 7/08
[52] U.S. Cl. ..........................................................
[52] U.S. Cl. ..................................... lp;1p351/47; 351/57
[58] Field of Search ................................ 351/47, 48, 57, 351/58, 44, 41

[56] References Cited

U.S. PATENT DOCUMENTS

| | | | |
|---|---|---|---|
| 2,737,847 | 3/1956 | Tesauro | 351/41 |
| 2,770,168 | 11/1956 | Tesauro | 351/41 |
| 3,498,701 | 3/1970 | Miller | 351/57 |
| 3,531,188 | 9/1970 | LeBlanc et al. | 351/48 |
| 3,565,517 | 2/1971 | Gitlin et al. | 351/106 |
| 3,582,192 | 6/1971 | Gitlin et al. | 351/52 |
| 3,838,914 | 10/1974 | Fernandez | 351/106 |
| 4,070,103 | 1/1978 | Meeker | 351/52 |
| 4,196,981 | 4/1980 | Waldrop | 351/59 |
| 4,547,909 | 10/1985 | Bell | 2/431 |
| 4,988,181 | 1/1991 | Riach | 351/52 |
| 5,181,051 | 1/1993 | Townsend et al. | 351/52 |
| 5,243,366 | 9/1993 | Blevins | 351/57 |
| 5,321,442 | 6/1994 | Albanese | 351/44 |
| 5,389,981 | 2/1995 | Riach | 351/158 |
| 5,410,763 | 5/1995 | Bolle | 2/436 |
| 5,416,537 | 5/1995 | Sadler | 351/57 |
| 5,568,207 | 10/1996 | Chao | 351/57 |
| 5,642,177 | 6/1997 | Nishioka | 351/47 |
| 5,737,054 | 4/1998 | Chao | 351/57 |

FOREIGN PATENT DOCUMENTS

| | | |
|---|---|---|
| 1117593 | 2/1996 | China . |
| 0469699 | 2/1992 | European Pat. Off. . |
| 0743545 | 11/1996 | European Pat. Off. . |
| 915421 | 11/1946 | France . |
| 1037755 | 9/1953 | France . |
| 1061253 | 4/1954 | France . |
| 2483632 | 4/1981 | France . |
| 1266652 | 12/1981 | France . |
| 2657436 | 7/1991 | France . |
| 1797366 | 1/1971 | Germany . |
| 85 07 761 | 6/1985 | Germany . |
| 88 06 898 | 10/1988 | Germany . |
| 3905041 | 8/1990 | Germany . |
| WO 90/09611 | 8/1990 | Germany . |
| 3919489 | 12/1990 | Germany . |
| 3920879 | 1/1991 | Germany . |
| 3921987 | 1/1991 | Germany . |
| 39333310 | 1/1991 | Germany . |

(List continued on next page.)

OTHER PUBLICATIONS

English language abstract of Japanese Publication No. 55–50217.
English language abstract of Japanese Publication No. 54–111842.
English language abstract of Japanese Publication No.54–111841.

(List continued on next page.)

*Primary Examiner*—Hung Xuan Dang
*Attorney, Agent, or Firm*—Fliesler, Dubb, Meyer & Lovejoy

[57] ABSTRACT

An eyeglass combination includes a primary frame having a bridge and two side studs. An auxiliary frame includes a bridge and two side extensions each having a rear flange for engaging with the stud and for allowing the auxiliary frame to be secured to typical primary frame. The rear flanges each includes a magnet for engaging with another magnet engaged in the studs or for engaging with the studs of magnetic material. The magnets are preferably disposed laterally.

13 Claims, 1 Drawing Sheet

U.S. PATENT DOCUMENTS

| | | |
|---|---|---|
| 9216919 | 2/1993 | Germany . |
| 43 16 698 | 11/1994 | Germany . |
| 44-15392 | 7/1969 | Japan . |
| 54-111841 | 9/1979 | Japan . |
| 54-111842 | 9/1979 | Japan . |
| 55-50217 | 4/1980 | Japan . |
| 56-29209 | 3/1981 | Japan . |
| 57-184910 | 11/1982 | Japan . |
| 612621 | 1/1986 | Japan . |
| 1-136114 | 5/1989 | Japan . |
| 2-109325 | 8/1990 | Japan . |
| 5-157997 | 6/1993 | Japan . |
| 5-40493 | 10/1993 | Japan . |
| 7-128260 | 5/1995 | Japan . |
| 220885 | 6/1968 | Russian Federation . |
| 572222 | 1/1976 | Switzerland . |
| 76209045 | 9/1976 | Switzerland . |
| 274588 | 4/1996 | Taiwan . |
| 846425 | 8/1960 | United Kingdom . |
| 855268 | 11/1960 | United Kingdom . |

OTHER PUBLICATIONS

English language abstract of Japanese Publication No.1–136114.

English language abstract of Japanese Publication No.56–29209.

English language abstract of Japanese Publication No.44–15392.

English language abstract of Japanese Publication No.5–157997.

English language abstract of Japanese Publication No. 612621.

English language abstract of Japanese Publication No. 5–40493.

English language abstract of German Publication No. 9216919.

English language abstract of German Publication No.1797366.

English language abstract of German Publication No. 43 16 698.

English language abstract of German Publication No .39333310.

English language abstract of German Publication No. 3921987.

English language abstract of German Publication No. 3920879.

English language abstract of German Publication No. 3919489.

English language abstract of German Publication No.3905041.

English language abstract of French Publication No. 1266652.

English language abstract of French Publication No. 1037755.

English language abstract of French Publication No. 2,657, 436.

English language abstract of French Publication No. 2,483, 632.

English language abstract of French Publication No. 915, 421.

English language abstract of Switzerland Publication No. 572,222.

English language abstract of Russian Publication No. 220885.

English language abstract of Taiwan Publication No. 274588.

English language abstract of Chinese Publication No. 1117593.

Pentax Alleged Publication on Twincome.

EYEGLASS FRAMES WITH MAGNETS IN FLANGES

BACKGROUND OF THE INVENTION

1. Field of the Invention

The present invention relates to a pair of eyeglasses, and more particularly to a pair of eyeglasses having an auxiliary frame for supporting auxiliary lenses.

2. Description of the Prior Art

The closest prior art of which applicant is aware is U.S. Pat. No. 5,568,207 to Chao and has been assigned to the present assignee. The primary frame are required to be engaged with magnets for actuating with the magnets engaged in the auxiliary frame, such that the auxiliary frame may not be attached to typical spectacle frame having no magnets therein.

The present invention has arisen to mitigate and/or obviate the afore-described disadvantages of the conventional auxiliary spectacle frames.

SUMMARY OF THE INVENTION

The primary objective of the present invention is to provide an auxiliary frame for attaching typical spectacle frame having no magnets therein.

The other objective of the present invention is to provide a primary frame and an auxiliary frame having magnets disposed laterally.

In accordance with one aspect of the invention, there is provided an eyeglass combination comprising a primary frame including a first bridge and including two sides each having a stud, and an auxiliary frame for disposing in front of the primary frame, the auxiliary frame including a second bridge and including two sides each having an extension extended rearward toward the primary frame and extended over the studs, the extensions each including a rear end having a first flange extended downward for engaging with the stud and for securing the auxiliary frame to the primary frame.

The studs of the primary frame are made of magnetic material, the first flanges each includes a magnet for engaging with the studs of magnetic material and for securing the auxiliary frame to the primary frame.

The studs of the primary frame each includes a first magnet, the first flanges each includes a second magnet for engaging with the first magnet of the stud and for securing the auxiliary frame to the primary frame.

The first and the second magnets each includes a first pole and a second pole disposed in front of the first pole.

The second bridge includes an arm extended over the first bridge of the primary frame, the arm includes a rear end having a second flange extended downward for engaging with the first bridge and for securing the auxiliary frame to the primary frame.

The first bridge of the primary frame includes a first magnet, the second flange includes a second magnet for engaging with the first magnet of the first bridge and for securing the auxiliary frame to the primary frame.

In accordance with another aspect of the invention, there is provided an eyeglass combination comprising a primary frame including a first bridge, the first bridge including a first magnet, and an auxiliary frame for disposing in front of the primary frame, the auxiliary frame including a second bridge having an arm extended rearward toward the primary frame and extended over the first bridge, the arm including a rear end having a flange extended downward for engaging with the first bridge and for securing the auxiliary frame to the primary frame, the flange including a second magnet for engaging with the first magnet and for securing the auxiliary frame to the primary frame.

In accordance with the other aspect of the invention, there is provided an eyeglass combination comprising a primary frame including a first bridge and including two sides each having a stud, and an auxiliary frame for disposing in front of the primary frame, the auxiliary frame including a second bridge and including two sides each having an extension extended rearward toward the primary frame and extended over the studs, the second bridge including an arm extended rearward, the extensions and the arm each including a rear end having a flange extended downward for engaging with the stud and the first bridge and for securing the auxiliary frame to the primary frame.

The studs and the first bridge of the primary frame are made of magnetic material, the flanges each includes a magnet for engaging with the studs and the first bridge of magnetic material and for securing the auxiliary frame to the primary frame.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
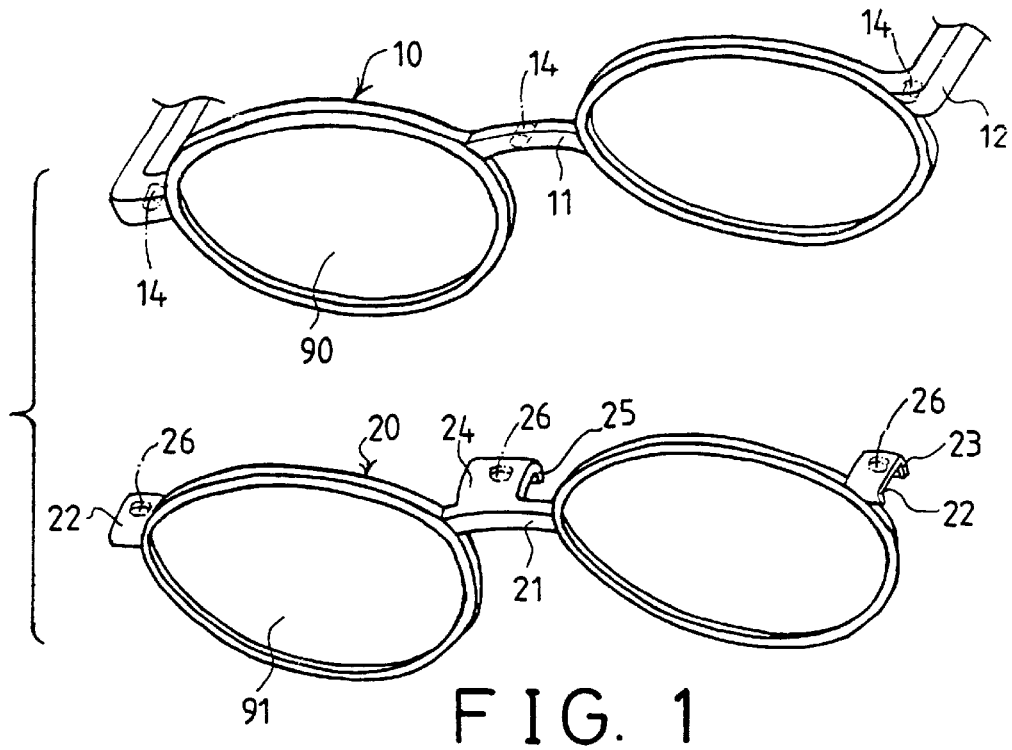
FIG. 1 is an exploded view of an eyeglass combination having an auxiliary frame in accordance with the present invention.
Figure 2:
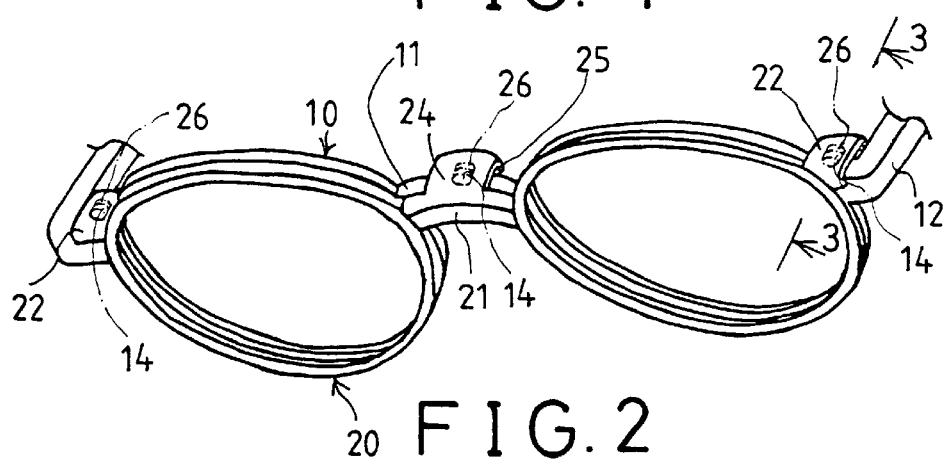
FIG. 2 is a perspective view of the eyeglass combination.
Figure 3:
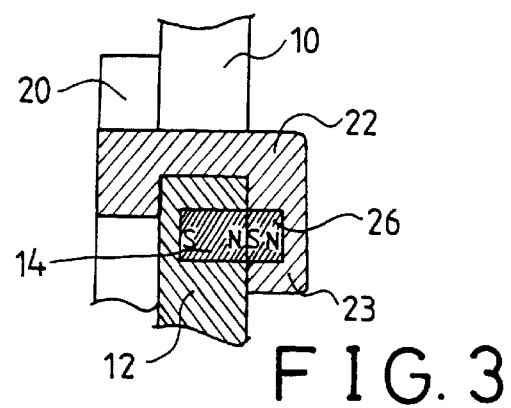
FIG. 3 is a cross sectional view taken along lines 3—3 of FIG. 2.

Referring to the drawings, and initially to FIGS. 1 and 2, an eyeglass combination in accordance with the present invention comprises a primary frame 10 for supporting primary lenses 90 and including a bridge 11 formed in the middle and including two studs 12 formed in the side portions. The bridge 11 and the studs 12 each includes a magnet 14 disposed laterally having a pole (such as S as shown in FIG. 3) arranged in front of the other (N in FIG. 3).

An auxiliary frame 20 for supporting auxiliary lenses 91 and for disposing in front of the primary frame includes a bridge 21 and two extensions 22 disposed in the side portions and extended rearward for engaging over the bridge 11 and the studs 12 of the primary frame 10 respectively. The bridge 21 includes an arm 24 extended rearward. The extensions 22 and the arm 24 each includes a rear end having a flange 23, 25 dependent downward. The flanges 23, 25 each includes a magnet 26 disposed laterally having a pole (S in FIG. 3) arranged in front of the other (N in FIG. 3) for allowing the S pole to engage with the N pole of the magnet 14 of the primary frame 10.

It is to be noted that the flanges 23, 25 of the extensions 22 and of the arm 24 are extended downward for engaging with the studs 12 and the bridge 11 such that the flanges 23, 25 themselves form a hook means for securing the auxiliary frame 20 to the primary frame 10. In addition, the magnets 14, 26 are disposed laterally such that the flanges 23, 25 may further be stably and solidly attracted and retained in place.

It is further to be noted that the flanges 23, 25 may also be used to hook to the typical eyeglasses having no magnets engaged therein, such that the auxiliary frame 20 may be attached to any of the typical eyeglasses. Particularly, when the typical eyeglasses are made of metal or other magnetic materials, the magnets 26 of the auxiliary frame 20 may also be used for attracting the typical eyeglasses and may also be used for solidly securing the auxiliary frame to the typical eyeglasses.

It is also to be noted that with only the arm 24 and the magnet 26 therein, the auxiliary frame 20 may also be solidly secured to the primary frame 10. Without the arm 24 and without the magnets 26, the auxiliary frame 20 may also be secured to the primary frame 10 by engaging the flanges 23 with the studs 12. The provision of the magnets 26 and 14 may further solidly secure the auxiliary frame 20 to the primary frame 10.

Accordingly, the eyeglass combination in accordance with the present invention includes an auxiliary frame having a pair of extensions and/or an arm for engaging with the studs and/or the bridge of the primary frame, for allowing the auxiliary frame to be secured to various kinds of eyeglasses having no magnets therein. In addition, the provision of the flanges 23, 25 may also be used for solidly securing the auxiliary frame to the primary frame 10.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass combination comprising:
   a primary frame including a first bridge and two sides each having a stud; and
   an auxiliary frame for disposing in front of the primary frame, the auxiliary frame including a second bridge and two sides each having an extension extended rearward toward the primary frame and extended over one of the studs, the extensions each including a rear end having a first flange extended downward;
   wherein
      said studs of said primary frame each includes a magnetic material;
      said first flanges, themselves not being magnets, each includes a magnet for engaging laterally with the magnetic material of one stud and for securing said auxiliary frame to said primary frame; and
      when the auxiliary frame is coupled to the primary frame,
         the extensions can be supported by the studs to prevent the auxiliary frame from moving downward relative to the primary frame; and
         the flanges are located behind the studs to further secure the auxiliary frame to the primary frame, and to reduce the likelihood of the auxiliary frame from being disengaged from the primary frame if the auxiliary frame is being pulled forward relative to the primary frame.

2. An eyeglass combination according to claim 1 wherein the magnetic material in each stud is a magnet.

3. An eyeglass combination according to claim 2, wherein said first and said second magnets each includes a first pole and a second pole disposed in front of said first pole.

4. An eyeglass combination according to claim 2 wherein said second bridge includes an arm extended over said first bridge of said primary frame, said arm includes a rear end having a second flange extended downward for engaging with said first bridge and for securing said auxiliary frame to said primary frame.

5. An eyeglass combination according to claim 4 wherein said first bridge of said primary frame includes a magnet, said second flange includes a magnet for engaging with the magnet of the first bridge and for securing the auxiliary frame to the primary frame.

6. An eyeglass combination according to claim 1 wherein said second bridge includes an arm extended over said first bridge of said primary frame, said arm includes a rear end having a second flange extended downward for engaging with said first bridge and for securing said auxiliary frame to said primary frame.

7. An eyeglass combination according to claim 6, wherein said first bridge of said primary frame includes a first magnet, said second flange includes a second magnet for engaging with said first magnet of said first bridge and for securing said auxiliary frame to said primary frame.

8. An eyeglass combination according to claim 6, wherein said first bridge of said primary frame is made of magnetic material, said second flange includes a magnet for engaging with said first bridge of magnetic material and for securing said auxiliary frame to said primary frame.

9. An eyeglass combination comprising:
   a primary frame including a first bridge, said first bridge including a first magnet;
   an auxiliary frame for disposing in front of said primary frame, said auxiliary frame including a second bridge having an arm extended rearward toward said primary frame and extended over said first bridge, said arm including a rear end having a flange extended downward for engaging with said first bridge and for securing said auxiliary frame to said primary frame, said flange, itself not being a magnet, including a second magnet for engaging laterally with said first magnet and for securing said auxiliary frame to said primary frame;
   wherein when the auxiliary frame is coupled to the primary frame,
      the arm can be supported by the first bridge to prevent the auxiliary frame from moving downward relative to the primary frame; and
      the flange is located behind the first bridge to further secure the auxiliary frame to the primary frame, and to reduce the likelihood of the auxiliary frame from being disengaged from the primary frame if the auxiliary frame is being pulled forward relative to the primary frame.

10. An eyeglass device for coupling to a primary frame, the primary frame including a first bridge and two sides, each side of the primary frame having a stud, each stud including a magnetic material, the eyeglass device comprising:
    an auxiliary frame for disposing in front of the primary frame, the auxiliary frame including a second bridge and two sides, each side having an extension extended rearward toward the primary frame and extended over one of the studs, the extensions each including a rear end having a first flange extended downward; and
    wherein
       said first flanges, themselves not being magnets, each includes a magnetic material for magnetically engaging in a lateral manner with the magnetic material in each stud and for securing said auxiliary frame to said primary frame; and when the auxiliary frame is coupled to the primary frame,
- the extensions can be supported by the studs to prevent the auxiliary frame from moving downward relative to the primary frame; and
- the flanges are located behind the studs to further secure the auxiliary frame to the primary frame, and to reduce the likelihood of the auxiliary frame from being disengaged from the primary frame if the auxiliary frame is being pulled forward relative to the primary frame.

11. An eyeglass device for coupling to a primary frame, the primary frame including a first bridge, the first bridge including a magnetic material, the eyeglass device comprising:

an auxiliary frame including a second bridge, the second bridge having an arm extended rearward toward said primary frame and extended over said first bridge, said arm including a rear end having a flange extended downward for engaging with said first bridge and for securing said auxiliary frame to said primary frame, said flange, itself not being a magnet, including a magnetic material for magnetically engaging in a lateral manner with the magnetic material in the first bridge and for securing said auxiliary frame to said primary frame;

wherein when the auxiliary frame is coupled to the primary frame,
- the arm can be supported by the first bridge to prevent the auxiliary frame from moving downward relative to the primary frame; and
- the flange is located behind the first bridge to further secure the auxiliary frame to the primary frame, and to reduce the likelihood of the auxiliary frame from being disengaged from the primary frame if the auxiliary frame is being pulled forward relative to the primary frame.

12. A primary frame adapted to support an auxiliary frame, which includes a first bridge and two sides, each side having an extension and each extension including a rear end having a first flange extended downward, each flange, itself not being a magnet, including a magnetic material, the primary frame comprising:

a second bridge; and two sides, each having a stud, each stud including a magnetic material;

wherein when the primary frame is supporting the auxiliary frame,
- each magnetic material of the primary frame magnetically engages in a lateral manner with one of the magnetic materials of the auxiliary frame for securing said auxiliary frame to said primary frame;
- each stud is extended over by one of the extensions, and can support that extension to prevent the auxiliary frame from moving downward relative to the primary frame; and
- the flanges are located behind the studs to further secure the auxiliary frame to the primary frame, and to reduce the likelihood of the auxiliary frame from being disengaged from the primary frame if the auxiliary frame is being pulled forward relative to the primary frame.

13. A primary frame adapted to support an auxiliary frame, which includes a first bridge having an arm, the arm including a rear end having a flange extended downward, the flange, itself not being a magnet, including a magnetic material, the primary frame comprising:

a second bridge, which includes a magnetic material;

wherein when the primary frame is supporting the auxiliary frame, the magnetic material of the primary frame magnetically engages in a lateral manner with the magnetic material of the auxiliary frame for securing said auxiliary fame to said primary frame;

the second bridge can support the arm, to prevent the auxiliary frame from moving downward relative to the primary frame; and the second bridge is located in front of the flange to further secure the auxiliary frame to the primary frame, and to reduce the likelihood of the auxiliary frame from being disengaged from the primary frame if the auxiliary frame is being pulled forward relative to the primary frame.

* * * * *

(12) EX PARTE REEXAMINATION CERTIFICATE (7111th)
United States Patent
Chao

(10) Number: US 6,109,747 C1
(45) Certificate Issued: *Oct. 20, 2009

(54) EYEGLASS FRAMES WITH MAGNETS IN FLANGES

(75) Inventor: David Yinkai Chao, Towson, MD (US)

(73) Assignee: Contour Optik Inc., Chia Yi Hsien (TW)

Reexamination Request:
No. 90/008,863, Sep. 13, 2007

Reexamination Certificate for:
| Patent No.: | 6,109,747 |
| Issued: | Aug. 29, 2000 |
| Appl. No.: | 08/847,711 |
| Filed: | Apr. 28, 1997 |

(*) Notice: This patent is subject to a terminal disclaimer.

(51) Int. Cl.
*G02C 9/00* (2006.01)

(52) U.S. Cl. .............................. 351/47; 351/57
(58) Field of Classification Search .......... None
See application file for complete search history.

(56) References Cited

U.S. PATENT DOCUMENTS

| 188,246 A | 3/1877 | Johnson |
|---|---|---|
| 1,613,765 A | 1/1927 | Nerney |
| 1,679,233 A | 7/1928 | Strauss |
| 1,907,749 A | 5/1933 | Dechau |
| 1,936,319 A | 11/1933 | Wingate |
| 2,065,122 A | 12/1936 | Diggins |
| 2,117,436 A | 5/1938 | Lindblom |
| 2,141,063 A | 12/1938 | Euler |
| 2,254,637 A | 9/1941 | Welsh |
| 2,492,072 A | 12/1949 | Tapner |
| 2,587,472 A | 2/1952 | Hoffmaster |
| D170,435 S | 9/1953 | Weissman |
| 2,737,847 A | 3/1956 | Tessauro |
| 2,770,168 A | 11/1956 | Tessauro |
| 3,498,701 A | 3/1970 | Miller |
| 3,531,188 A | 9/1970 | LeBlanc et al. |
| 3,531,190 A | 9/1970 | LeBlanc |
| 3,536,385 A | 10/1970 | Johnston |
| 3,565,517 A | 2/1971 | Gitlin et al. |
| 3,582,192 A | 6/1971 | Gitlin et al. |
| D221,480 S | 8/1971 | Tagnon |
| 3,838,914 A | 10/1974 | Fernandez |
| 4,021,892 A | 5/1977 | Piper |
| 4,070,103 A | 1/1978 | Meeker |
| 4,070,105 A | 1/1978 | Marzouk |
| 4,196,981 A | 4/1980 | Waldrop |
| 4,217,037 A | 8/1980 | Lemelson |
| 4,380,379 A | 4/1983 | Ahern |
| 4,432,616 A | 2/1984 | Kurosaka |
| 4,466,713 A | 8/1984 | Tanaka |
| 4,547,909 A | 10/1985 | Bell |
| 4,685,782 A | 8/1987 | Lhospice |
| D291,808 S | 9/1987 | Meyerspeer |
| 4,822,158 A | 4/1989 | Porsche |

(Continued)

FOREIGN PATENT DOCUMENTS

| CA | 773287 | 12/1967 |
|---|---|---|
| CH | 76209045 | 9/1976 |

(Continued)

OTHER PUBLICATIONS

US 5,321,422, 6/1994, Albanese (withdrawn)
Memorandum of Law in Support of Motion of Defendant Clariti Eyewear, Inc., for Summary Judgment (Redacted); Mar. 18, 2008.

(Continued)

*Primary Examiner*—Sharon E Payne

(57) ABSTRACT

An eyeglass combination includes a primary frame having a bridge and two side studs. An auxiliary frame includes a bridge and two side extensions each having a rear flange for engaging with the stud and for allowing the auxiliary frame to be secured to typical primary frame. The rear flanges each includes a magnet for engaging with another magnet engaged in the studs or for engaging with the studs of magnetic material. The magnets are preferably disposed laterally.

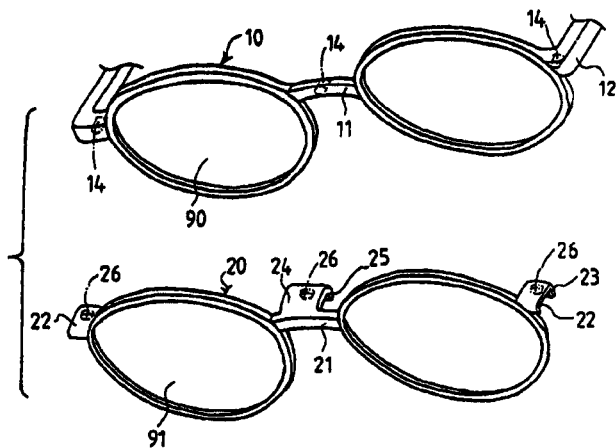

U.S. PATENT DOCUMENTS

| | | | |
|---|---|---|---|
| 4,878,749 | A | 11/1989 | McGee |
| D307,756 | S | 5/1990 | Porsche |
| 4,988,181 | A | 1/1991 | Riach |
| 5,181,051 | A | 1/1993 | Townsend et al. |
| 5,243,366 | A | 9/1993 | Blevins |
| 5,321,442 | A | 6/1994 | Albanese |
| 5,389,981 | A | 2/1995 | Riach |
| 5,410,763 | A | 5/1995 | Bolle |
| 5,416,537 | A | 5/1995 | Sadler |
| 5,642,177 | A | 6/1997 | Nishioka |
| 5,682,222 | A | 10/1997 | Chao |
| 5,684,558 | A | 11/1997 | Hamamoto |
| 5,696,571 | A | 12/1997 | Spencer et al. |
| 5,710,614 | A | 1/1998 | Cereda |
| 5,724,118 | A | 3/1998 | Krebs |
| 5,737,054 | A | 4/1998 | Chao |
| 5,867,244 | A | 2/1999 | Martin |
| 5,877,838 | A | 3/1999 | Chao |
| 5,882,101 | A | 3/1999 | Chao |
| 5,883,688 | A | 3/1999 | Chao |
| 5,883,689 | A | 3/1999 | Chao |
| 5,889,574 | A | 3/1999 | Gandl-Schiller |
| 5,912,718 | A | 6/1999 | Murai et al. |
| 5,914,768 | A | 6/1999 | Hyoi |
| 5,929,964 | A | 7/1999 | Chao |
| 6,012,811 | A | 1/2000 | Chao et al. |
| 6,092,896 | A | 7/2000 | Chao et al. |
| 6,109,747 | A | 8/2000 | Chao |
| 6,149,269 | A | 11/2000 | Madison |
| 6,170,948 | B1 | 1/2001 | Chao |
| 7,040,751 | B2 | 5/2006 | Madison |

FOREIGN PATENT DOCUMENTS

| | | |
|---|---|---|
| CH | 572222 | 4/1996 |
| CN | 107096 | 4/1985 |
| CN | 1117593 | 2/1996 |
| DE | 1767366 | 1/1971 |
| DE | 85 07 761.5 | 6/1985 |
| DE | 88 06 898.6 | 10/1988 |
| DE | 3905041 | 8/1990 |
| DE | 3919489 | 12/1990 |
| DE | 3920879 | 1/1991 |
| DE | 3921987 | 1/1991 |
| DE | 39333310 | 1/1991 |
| DE | 92 16 919.8 | 2/1993 |
| DE | 43 16 698 | 11/1994 |
| DE | 29518590 | 3/1996 |
| EP | 0469699 | 2/1992 |
| EP | 0502796 B1 | 2/1995 |
| EP | 0743545 | 11/1996 |
| FR | 915421 | 11/1946 |
| FR | 1037755 | 9/1953 |
| FR | 1061253 | 4/1954 |
| FR | 2483632 | 4/1981 |
| FR | 1266652 | 12/1981 |
| FR | 2657436 | 7/1991 |
| GB | 846425 | 8/1960 |
| GB | 855268 | 11/1960 |
| JP | 57-184910 | 5/1956 |
| JP | 44-15392 | 7/1969 |
| JP | 54-111841 | 9/1979 |
| JP | 54-111842 | 9/1979 |
| JP | 54-163052 | 12/1979 |
| JP | 55-50217 | 4/1980 |
| JP | 55-083022 | 6/1980 |
| JP | 55-133014 | 10/1980 |
| JP | 55-135814 | 10/1980 |
| JP | 56-29209 | 3/1981 |
| JP | 56-095214 | 8/1981 |
| JP | 57-178215 | 11/1982 |
| JP | 57-184910 | 11/1982 |
| JP | 61-2621 | 1/1986 |
| JP | 56-153317 | 11/1987 |
| JP | 63-188626 | 2/1988 |
| JP | 1-136114 | 5/1989 |
| JP | 2-109325 | 8/1990 |
| JP | 5-157997 | 6/1993 |
| JP | 05-196899 | 8/1993 |
| JP | 5-40493 | 10/1993 |
| JP | 05-289029 | 11/1993 |
| JP | 06-265828 | 9/1994 |
| JP | 06-331943 | 12/1994 |
| JP | 07-028001 | 1/1995 |
| JP | 07-010722 | 2/1995 |
| JP | 07-056123 | 3/1995 |
| JP | 3011174 | 5/1995 |
| JP | 07-244259 | 9/1995 |
| JP | 08-050263 | 2/1996 |
| JP | 9-043544 A | 2/1997 |
| JP | 9-061754 A | 3/1997 |
| JP | 09101489 | 4/1997 |
| JP | 7-128620 | 5/1998 |
| JP | 07-156856 | 10/2008 |
| RU | 220885 | 6/1968 |
| TW | 274588 | 4/1996 |
| WO | 90/09611 | 8/1990 |
| WO | 95/18986 | 7/1995 |
| WO | 95/23995 | 9/1995 |
| WO | 96/23241 | 8/1996 |

OTHER PUBLICATIONS

Plaintiff's Corrected Memorandum in Opposition to Defendant's Motion for Summary Judgement (Redacted); May 5, 2008.

Reply Memorandum of Law in Support of Motion of Defendant Clariti Eyewear, Inc., for Summary Judgement; May 5, 2008.

Order Granting Clariti's Motion for Summary Judgement on Equitable Estoppel; Nov. 26, 2008.

Miracle Optics Inc.'s Notice of Motion and Motion for Partial Summary Judgment of Invalidity of '747 Patent Claim 12; Oct. 27, 2003.

Plaintiff's Memorandum of Points and Authorities in Opposition to Miracle Optics, Inc.'s Motion for Judgment of Invalidity of Claim 12 of the 747 Patent; Oct. 27, 2003.

Miracle Optics' Reply to Plaintiff's Opposition to Miracle's Motion for Partial Summary Judgment of Invalidity of the '747 Patent Claim 12; Oct. 27, 2003.

Order Denying Defendant's Motion for Partial Summary Judgment of Invalidity of Claim 12 of the '747 Patent; Oct. 28, 2003.

"Twincome–Pentax Documents" Describing Twincome in a Patent Opposition in Germany Initiated by Pentax, on or about Apr. 30, 1997.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3, 10 and 12 is confirmed.

New claims 14–18 are added and determined to be patentable.

Claims 4–9, 11 and 13 were not reexamined.

*14. An eyeglass device according to claim 10, wherein each first flange extended downward from the rear end of each side extension of the auxiliary frame includes a magnet.*

*15. An eyeglass device according to claim 10, wherein each stud of the primary frame and each first flange extended downward from the rear end of each side extension of the auxiliary frame includes a magnet.*

*16. A primary frame adapted to support an auxiliary frame according to claim 12, wherein the magnetic material of each stud of the primary frame is a magnet.*

*17. A primary frame adapted to support an auxiliary frame according to claim 12, wherein the magnetic material of each first flange of the auxiliary frame is a magnet.*

*18. A primary frame adapted to support an auxiliary frame according to claim 12, wherein the magnetic material of each stud of the primary frame and each first flange of the auxiliary frame is a magnet.*

* * * * *